United States Patent [19]

Laughner

[11] Patent Number: 5,270,386

[45] Date of Patent: Dec. 14, 1993

[54] STYRENIC COPOLYMERS MODIFIED WITH POLY (PHENYLENE ETHER)

[75] Inventor: Michael K. Laughner, Lake Jackson, Tex.

[73] Assignee: The Dow Chemical Company, Midland, Mich.

[21] Appl. No.: 851,371

[22] Filed: Mar. 10, 1992

[51] Int. Cl.$^5$ .................. C08L 71/12; C08L 77/00
[52] U.S. Cl. ........................... 525/66; 525/64; 525/67; 525/68; 525/133; 525/146; 525/397; 525/905
[58] Field of Search ............... 525/68, 133, 397, 905, 525/66, 64, 67, 146

[56] References Cited

U.S. PATENT DOCUMENTS

| | | | |
|---|---|---|---|
| 3,383,435 | 5/1968 | Cizek | 525/132 |
| 3,652,726 | 3/1972 | Nield et al. | 525/67 |
| 4,090,996 | 5/1978 | Gergen et al. | 525/92 |
| 4,111,895 | 9/1978 | Gergen et al. | 525/92 |
| 4,119,607 | 10/1978 | Gergen et al. | 525/92 |
| 4,167,507 | 9/1979 | Haaf | 525/92 |
| 4,252,913 | 2/1981 | Katchman et al. | 525/93 |
| 4,339,376 | 7/1982 | Kasahara et al. | 525/133 |
| 4,423,189 | 12/1983 | Haaf | 525/92 |
| 4,485,219 | 11/1984 | Falk et al. | 525/394 |
| 4,526,926 | 7/1985 | Weber et al. | 525/67 |
| 4,757,109 | 7/1988 | Kishida et al. | 525/68 |
| 4,786,664 | 11/1988 | Yates, III | 524/417 |
| 4,804,712 | 2/1989 | Traugott et al. | 525/152 |
| 4,806,297 | 2/1989 | Brown et al. | 525/92 |
| 4,816,510 | 3/1989 | Yates, III | 524/449 |
| 4,866,130 | 9/1989 | Brown et al. | 525/92 |
| 4,885,339 | 12/1989 | Traugott et al. | 525/132 |
| 5,008,333 | 4/1991 | Yates, III et al. | 525/92 |
| 5,091,470 | 2/1992 | Wolsink et al. | 525/73 |

FOREIGN PATENT DOCUMENTS

| | | |
|---|---|---|
| 61-174249 | 8/1986 | Japan . |
| 63-241058 | 10/1988 | Japan | 525/68 |
| 8804309 | 6/1988 | World Int. Prop. O. | 525/68 |

Primary Examiner—James J. Seidleck
Assistant Examiner—Thomas Hamilton, III

[57] ABSTRACT

A blend of a vinyl aromatic copolymer, and a poly(phenylene ether) concentrate containing poly(phenylene ether), a vinyl aromatic copolymer, polyamide, polycarbonate, polyester, poly(alkyl acrylate), and/or poly(alkyl methacrylate). The blend may optionally contain impact modifiers, thermoplastic molding materials including polyester, polystyrene, polyolefin, polyamide, poly(vinyl chloride), polyurethane, polyacetal, and conventional additives such as dyes and pigments.

7 Claims, 1 Drawing Sheet

Figure 1

STYRENIC COPOLYMERS MODIFIED WITH POLY (PHENYLENE ETHER)

FIELD OF THE INVENTION

This invention relates to styrenic copolymer compositions which have been modified with poly(phenylene ether), and to methods of melt processing and molding such compositions.

BACKGROUND OF THE INVENTION

It is frequently desired that articles molded from thermoplastics such as styrenic copolymers have low gloss. It is known that gloss can be reduced in a molded article by, for example, adding a filler such as talc to the molding composition, lowering the temperature of the mold, or etching on the mold a pattern which becomes imprinted on the surface of the article. It has been found, however, that an article characterized by reduced gloss can also be obtained by molding it from the poly(phenylene ether) modified compositions of this invention.

SUMMARY OF THE INVENTION

In one aspect, this invention involves a composition of matter containing, in admixture.
 (a) random, alternate, block or grafted copolymer prepared from a vinyl aromatic compound and one or more members of the group consisting of a vinyl nitrile compound, a diene, an alkyl acrylate, an alkyl methacrylate, glycidyl methacrylate, ethylene/propylene/diene copolymer, maleic anhydride, an alkyl or aryl maleimide compound, and an oxazoline compound: and
 (b) (i) poly(phenylene ether): (ii) a blend of poly(phenylene ether) with one or more of components (A) to (G). as follows: (A) polystyrene. (B) a random, alternate, block, hydrogenated block or grafted copolymer prepared from a vinyl aromatic compound and one or more members of the group consisting of a vinyl nitrile compound, a diene, an alkyl acrylate, an alkyl methacrylate, glycidyl methacrylate, ethylene/propylene/diene copolymer, maleic anhydride, an alkyl or aryl maleimide compound, and an oxazoline compound, (C) polyamide, (D) polycarbonate, (E) polyester, (F) poly(alkyl acrylate), and (G) poly(alkyl methacrylate); or (iii) a mixture thereof.

In another aspect, this invention involves a method of molding an article comprising (I) forming a composition by melting in a molding machine components (a) and (b) which have not previously been melted together, said components (a) and (b) comprising
 (a) a random, alternate, block or grafted copolymer prepared from a vinyl aromatic compound and one or more members of the group consisting of a vinyl nitrile compound, a diene, an alkyl acrylate, an alkyl methacrylate, glycidyl methacrylate, ethylene/propylene/diene copolymer, maleic anhydride, an alkyl or aryl maleimide compound, and an oxazoline compound: and
 (b) a blend of poly(phenylene ether) with one or more of components (1) to (7), as follows: (1) polystyrene, (2) a random, alternate, block, hydrogenated block or grafted copolymer prepared from a vinyl aromatic compound and one or more members of the group consisting of a vinyl nitrile compound, a diene, an alkyl acrylate, an alkyl methacrylate, glycidyl methacrylate, ethylene/propylene/diene copolymer, maleic anhydride, an alkyl or aryl maleimide compound, and an oxazoline compound.
 (3) polyamide. (4) polycarbonate, (5) polyester, (6) poly(alkyl acrylate). and (7) poly(alkyl methacrylate): and
 (II) molding said article from said composition.

It has been found that not only does an article molded from a composition of this invention exhibit a desirably low level of gloss, but such an article also exhibits lower gloss than does an article molded at the same molding conditions from a composition not containing the same components as the poly(phenylene ether)-modified compositions of this invention. In general, molding an article at a higher temperature increases the gloss of such article as compared with the result of lower temperature molding conditions. The low gloss property of the compositions of this invention therefore makes it possible to mold an article at high temperature, as required for example by a complicated mold, while still obtaining a part which is characterized by low gloss. This makes it possible, for example, to more easily produce low gloss, thin-walled parts.

The compositions of this invention are useful, for example, in the production of films, fibers, extruded sheets, multi-layer laminates and molded or shaped articles of virtually all varieties, especially appliance and instrument housings, motor vehicle body panels and other parts and components for use in the automotive and electronics industries, such as radios and pagers. The methods of this invention are useful for preparing compositions and molded articles having applications which are the same as or similar to the foregoing.

DETAILED DESCRIPTION OF THE INVENTION

The compositions of this invention are those in which (a) a vinyl aromatic copolymer has been admixed in a composition with (b) (i) poly(phenylene ether) and/or (ii) a poly(phenylene ether) blend. The compositions of this invention may optionally contain one or more of the following: (c) an elastomeric impact modifier, and (d) a thermoplastic molding polymer selected from polyester, polystyrene, polyolefin, polyamide, poly(vinyl chloride), polyurethane and polyacetal. Suitable ranges of content for components (a)–(d) in the compositions of this invention, expressed in parts by weight of the total composition, are as follows:
 (a) vinyl aromatic copolymer from about 10 parts to about 98 parts, advantageously from about 15 parts to about 98 parts, preferably from about 25 parts to about 95 parts, more preferably from about 30 parts to about 93 parts, and most preferably from about 35 parts to about 93 parts.
 (b) (i) poly(phenylene ether) from about 0.2 part to about 30 parts, advantageously from about 0.5 part to advantageously from about 0.5 part to about 20 parts, preferably from about 1 part to about 10 parts, more preferably from about 1 part to about 8 parts, and most preferably from about 1 part to about 5 parts, (b) (ii) poly(phenylene ether) blend from about 0.5 part to about 60 parts, advantageously from about 1 part to about 40 parts, preferably from about 1 part to about 30 parts, more preferably from about 1 part to about 25 parts, and most preferably from about 1 part to about 20 parts, provided the resulting poly(phenylene ether) content in the final composition is as set forth in (b)(i), above, (c) elastomeric impact modifier up to about 30 parts, and preferably from about 1 to about 15 parts, and (d) thermoplastic molding polymer up to about 95 parts, and preferably from about 1 to about 70 parts.

Also included within this invention are the reaction products, if any, of the above named components when admixed in the compositions of this invention.

Preparation of the compositions of this invention can be accomplished by any suitable mixing means known in the art. Typically the substances to be admixed with polycarbonate are dry blended in particulate form with sufficient agitation to obtain thorough distribution thereof. If desired, the dry-blended formulation can further be melt mixed, for example in an extruder with or without a vacuum, or otherwise compounded with additional substances. Apparatus which can be used in the blending process include, for example, mixing rolls, a dough-mixer or a Banbury mixer.

When softened or melted by the application of heat, the compositions of this invention can undergo fabrication and can therein be formed or molded using conventional techniques such as compression, injection molding, gas assisted injection molding, calendering, vacuum forming, thermoforming, extrusion and/or blow molding techniques, alone or in combination. The compositions can also be formed, spun or drawn into films, fibers, multi-layer laminates or extruded sheets, or can be compounded with one or more organic or inorganic substances, on any machine suitable for such purpose.

Articles molded from compositions prepared within the ranges of content stated above exhibit a desirably low level of gloss.

Component (a) in the compositions of this invention is a vinyl aromatic copolymer, and a vinyl aromatic copolymer may also be incorporated into component (b) (ii). A vinyl aromatic copolymer is a copolymer prepared from a vinyl aromatic compound and one or more copolymerizable, ethylenically unsaturated monomers. Appropriate copolymerizable, ethylenically unsaturated monomers for preparation of such a vinyl aromatic copolymer may be described in general as $R_2$—C=C—$R_2$, where each R is independently (a) (1) hydrogen (2) a halogen such as F, Cl, Br or I: (3) —OH: (4) —$CO_2$H; (5) —SH; (6) —CN; (7) —$NO_2$; or (8) —$C_1$-$C_8$Z; (9) —C(O)Z; (10) —$CO_2$Z; (11) —$CO_2$N$Z_2$; (12) —OZ; (13) —SZ; (14) —SOZ; (15) —$SO_2$Z; (16) —N$Z_2$; or (17) —P$Z_5$ (where Z is H. halogen, O, —OH, —$CO_2$H, —SH, —CN, —$NO_2$ or an epoxide ring: or a $C_1$-$C_{10}$ linear or branched, saturated or unsaturated, alkyl radical or a $C_6$-$C_{14}$ aryl radical substituted with halogen, —OH, —$CO_2$H, —SH, —CN, —$NO_2$ or an epoxide ring): or

(b) a $C_1$-$C_{10}$ linear or branched, saturated or unsaturated, alkyl radical optionally substituted with, or interruptible with, a phenyl radical or one or more members of group (a); or (c) a phenyl or naphthyl radical, each independently optionally substituted with a $C_1$-$C_6$ linear or branched, saturated or unsaturated, alkyl radical or one or more members of group (a).

However, it is not required that all of the substituents named above as being represented by R be utilized, and any one or more of such substituents, or sub-components thereof, may be omitted as desired in the practice of this invention. The vinyl aromatic copolymer may be a random, alternate, block, hydrogenated block or grafted copolymer, and a mixture of more than one vinyl aromatic copolymer may be used as well.

Ethylenically unsaturated monomers of particular interest for copolymerization with a vinyl aromatic compound include a vinyl nitrile compound, a diene, an alkyl or aryl acrylate or methacrylate, glycidyl methacrylate, an alkyl or aryl maleate or fumarate, maleic anhydride, an alkyl or aryl maleimide, ethylene/propylene/diene copolymer, and an oxazoline compound.

In addition to other particular species of various ethylenically unsaturated monomers which are noted below in the discussion of producing acrylonitrile/butadiene/styrene copolymer ("ABS"), the category of vinyl aromatic compounds includes styrene and substituted styrenes; vinyl nitrile compounds include acrylonitrile and substituted acrylonitriles: alkyl acrylates and methacrylates include $C_1$-$C_{10}$ acrylates and methacrylates: alkyl or aryl maleimide compounds include the reaction product of a $C_1$-$C_{10}$ alkyl or $C_6$-$C_{14}$ aryl primary amine and maleic anhydride; and an oxazoline compound includes those of the general formula where each J is independently hydrogen, halogen, a $C_1$-$C_{10}$ alkyl radical or a $C_6$-$C_{14}$ aryl radical.

One example of a vinyl aromatic copolymer useful as component (a) or for incorporation into component (b) (ii) is a vinyl aromatic/vinyl nitrile copolymer such as styrene/acrylonitrile copolymer ("SAN"). SAN which has been rubber modified is also suitable for use as a vinyl aromatic copolymer, and an example of a rubber modified SAN is a vinyl nitrile/diene/vinyl aromatic copolymer such as ABS.

ABS, an elastomeric-thermoplastic composite, is typically formed by the grafting of an SAN copolymer onto a polybutadiene substrate latex. The polybutadiene forms particles of rubber—the elastomeric component—which are dispersed as a discrete phase in a thermoplastic matrix formed by the SAN. The rubber content of a rubber-modified styrene/acrylonitrile copolymer employed in the compositions of this invention can be up to 80 percent, but is preferably less than 40 percent.

One method for making a vinyl aromatic copolymer is emulsion polymerization. For example, when ABS is made by emulsion polymerization, a rubber substrate latex is produced in an aqueous emulsion by a polymerization, which can be initiated by organic peroxides, persulfates or redox systems, of 1.3-butadiene alone or in combination with other diene monomers such as isoprene, 2,3-dimethyl butadiene-1,3 or piperylene, or a combination of two or more of these and a lesser amount of one or more of the following: vinyl aromatic monomers such as styrene, alpha-alkyl styrene. p-methoxy styrene. p-chloro styrene, dichloro styrene or vinyl naphthalene: vinyl nitrile monomers such as acrylonitrile, methacrylonitrile, ethacrylonitrile or alpha-chloro acrylonitrile: alkyl acrylates and methacrylates such as methyl acrylate, propyl acrylate. butyl acrylate, octyl acrylate, methyl alpha-chloro acrylate, methyl methacrylate, ethyl methacrylate or isobutyl methacrylate methacrylamide or acrylamide. N,N-diethyl acrylamide; aliphatic or aromatic maleimides such as N-phenyl maleimide: diethylchloromaleate: diethyl fumarate vinylidene chloride; methyl vinyl ketone or methyl isopropenyl ketone: vinyl pyridines; vinyl furan; vinyl carbazole; isobutylene or ethylene: and the like. It is preferred that, in the preparation of the rubber latex, the proportion of butadiene to other monomers in the substrate latex be in the range of about 2/1 to about 15/1.

After formation of the rubber latex substrate, it is subjected to further aqueous emulsion polymerization with styrene and acrylonitrile monomers, wherein the concentration of styrene is usually about 1.5 to 3.5 times that of acrylonitrile. However, other monomers (including various vinyl aromatic or vinyl nitrile compounds) such as methacrylonitrile, divinylbenzene, α-methyl styrene, α-methyl styrene, methyl methacrylate, N-phenyl maleimide, chlorinated and brominated styrenes, and methyl-, ethyl- or n-butylacrylate, or mixtures thereof, may also be used in conjunction with styrene and acrylonitrile as the grafting monomers.

Organic peroxides, azo compounds, persulfates. or redox systems are usually used to initiate polymerization. SAN is formed, some of which is grafted to the rubber latex substrate, and some of which is free. The latex containing both the grafted rubber and the free SAN is then mixed with a coagulant solution, heated and agitated to produce discrete particles of ABS resin. The slurry containing those particles is dewatered in a centrifuge, and the resin is dried. Methods for making ABS resin by emulsion polymerization, as described above, are discussed in greater detail in Childers, U.S. Pat. No. 2,820,773 and Calvert, U.S. Pat. No. 3,238,275, each being hereby incorporated as a part hereof.

Another method for making a vinyl aromatic copolymer is suspension polymerization. For example, when ABS is made by suspension polymerization, a preformed elastomeric (rubber) component, usually a polybutadiene or a butadiene/styrene copolymer, is dissolved in a mixture of styrene and acrylonitrile. The rubber component may be one of the several mentioned above with respect to emulsion polymerization of ABS, or may be a diene such as polyisoprene, polycyclopentadiene, natural rubber, chlorinated rubber or copolymers of butadiene with isobutylene.

The preferred ratio of styrene to acrylonitrile in the styrene-acrylonitrile solution is about 90/10 to about 60/40, and in the preferred recipe the rubber component constitutes from about 4% to less than about 40% of the product. As with the emulsion process described above, numerous other vinyl aromatic compounds will function in a manner equivalent to that of styrene, towit alphamethyl styrene, vinyl-toluene. vinylxylene, vinylethyl benzene or vinylchloro benzene. Methacrylonitrile is but one of many other other vinyl nitrile monomers which will serve in the place of, or in conjunction with, acrylonitrile.

The rubber component, monomers and initiator are charged to the reaction vessel and polymerization ensues until a conversion rate of about 15% to about 30% is reached, resulting in the production of a prepolymer. Phase inversion occurs, and the rubber precipitates from solution and becomes the discontinuous phase dispersed as particles ranging from 0.05 to 5 pm in size. The prepolymer is then placed in a suspension reactor in an aqueous solution containing a suspending agent, initiator and chain transfer agent. Typical suspending agents are carboxymethyl cellulose, polyvinyl alcohol, and polyglycol ethers. Typical initiators for the polymerization which occurs during suspension are t-butyl perbenzoate, di-t-butyl peroxide, or t-butylperoxy isopropyl carbonate. Agitation of the solution completes the polymerization. The process is completed by dewatering the slurry in a centrifuge, and moisture content is further reduced by flash drying. Manufacture of ABS by the suspension process, as described above, is discussed in greater detail in Carrock, U.S. Pat. No. 3,515,692 and Ackerman, U.S. Pat. No. 4,151,128, each being hereby incorporated as a part hereof.

A third method for production of a vinyl aromatic copolymer is bulk or mass polymerization. For example, when ABS is made by bulk or mass polymerization, it is formed by dissolving an elastomeric (rubber) component in the monomer mix, which contains styrene, acrylonitrile, an initiator and, frequently, a chain transfer agent such as a mercaptan or a terpinolene. The reaction can, however, be thermally initiated. The styrene and acrylonitrile monomers polymerize, some grafting to the rubber component, but most forming a monomer-polymer solution. As the relative volume of the monomer-SAN polymer phase increases, discrete rubber particles become dispersed in the matrix resulting from the monomer-SAN polymer phase. The rubber particles are stabilized by being grafted to SAN polymers at the interface between the particles and the SAN polymer matrix. Additional stabilization is furnished when monomer becomes occluded, and polymerizes, within the rubber particles. Because polymerization occurs completely within a monomer/polymer medium, viscosity increases as conversion increases. To allow continued agitation of the reaction mixture despite such increasing viscosity, diluents such as methyl ethyl ketone and ethylbenzene are added to the reactor. Upon the completion of polymerization, the melt is devolatilized using equipment such as a devolatilizing extruder or a flash evaporator, and vacuum is applied to remove unreacted monomers and diluents.

As is true of ABS made by the emulsion or suspension method, numerous substances can be used in the bulk method in place of, or conjunction with, styrene, examples of such substances being vinyl aromatic compounds as follows: alpha-methylstyrene. alpha-ethylstyrene, alpha-methylvinyltoluene: ring-substituted alkyl styrenes, e.g. vinyl toluene, o-ethylstyrene, p-ethylstyrene, 2,4-dimethylstyrene: ring-substituted halostyrenes, e.g., o-chlorostyrene, p-chlorostyrene, o-bromostyrene, 2,4-dichlorostyrene; ring-alkyl, ring-halo-substituted styrenes, e.g. 2-chloro-4-methylstyrene and 2,6-dichloro-4-methylstyrene. Also useful are methacrylates such as methyl methacrylate: maleic acid and its esters and anhydrides; aliphatic or aromatic maleimides such as N-phenyl maleimide; and mixtures of any of the foregoing. Methacrylonitrile can also be used in combination with acrylonitrile. Bulk methods for the preparation of ABS, as described above, are discussed in greater detail in Kruse, U.S. Pat. No. 4,187,260, Simon, U.S. Pat. No. 4,252,911 and Weber, U.S. Pat. No. 4,526,926, each being hereby incorporated as a part hereof.

AES (acrylonitrile/EPDM/styrene) copolymer is a vinyl aromatic copolymer which is obtained when styrene/acrylonitrile copolymer is rubber-modified by grafting SAN to a substrate made up of an EPDM (ethylene/propylene/non-conjugated diene) rubber. AES copolymers are discussed in greater detail in Henton, U.S. Pat. No. 4,766,175, which is incorporated as a part hereof. SAN can also be crosslinked to an acrylate elastomer to form a vinyl aromatic copolymer, as in the case of an ASA (acrylonitrile/styrene/acrylate) copolymer, which is discussed in greater detail in Yu, U.S. Pat. No. 3,944,631, which is also incorporated as a part hereof. Other vinyl aromatic copolymers of particular interest include aryl maleimimde/vinyl nitrile/diene/vinyl aromatic copolymer, vinyl aromatic/maleic anhydride copolymer, alkyl methacrylate/vinyl aromatic/vinyl nitrile copolymer. vinyl aromatic/alkyl methacrylate copolymer, vinyl aromatic/alkyl methacrylate/glydicyl methacrylate copolymer, vinyl aromatic/glydicyl methacrylate copolymer, styrene/butyl acrylate copolymer, methyl methacryalte/acrylonitrile/butadiene/styrene copolymer and phenyl maleimide/acrylonitrile/butadiene/styrene copolymer.

Yet another form which a vinyl aromatic copolymer can take, as component (a) or for blending with poly(phenylene ether) as component (b) (ii), is a block copolymer which can be either linear, branched, radial or teleblock, and can be either a di-block ("A-B") copolymer, tri-block ("A-B-A") copolymer, or radial teleblock copolymer with or without tapered sections, i.e. portions of the polymer where the monomers alternate or are in random order close to the point of transition between the A and B blocks. The A portion is made by polymerizing one or more vinyl aromatic hydrocarbon monomers, and has an average molecular weight of about 4,000 to about 115,000. and a weight preferably of about 8,000 to about 60,000. The B portion of the block copolymer results from polymerizing a diene and has a molecular weight of about 20,000 to about 450,000, and a weight preferably of about 50,000 to about 300,000. In the A-B di-block copolymer, each block, A or B, can vary from 10-90% of the total weight of the copolymer. In the A-B-A tri-block copolymer, the A end groups typically constitute about 2 wt % to about 55 wt % of the whole block copolymer, and preferably are between 5 wt % and 45 wt % of the whole block copolymer.

The A block of the block copolymer has properties characteristic of thermoplastic substances in that it has the stability necessary for processing at elevated temperatures and yet possesses good strength below the temperature at which it softens. The A block is polymerized predominantly from vinyl aromatic hydrocarbons, and substituted derivatives thereof wherein the aromatic moiety can be either mono- or polycyclic. Monomers from which the thermoplastic end blocks can be formed are, for example, styrene and substituted derivatives thereof such as α-methyl styrene, vinyl xylene, vinyl naphthalene, and the like, and mixtures of two or more thereof. Other vinyl monomers such as methyl acrylate, methyl methacrylate, phenyl maleimide, acrylonitrile or vinyl pyridine may be used in the formation of the A block together with the aromatic monomers. The polymerization can be initiated by lithium metal, or alkyl- or aryl lithium compounds such as butyl lithium or isoamyl lithium. Polymerization is normally conducted at temperatures ranging from about −20° C. to about 100° C. ranging

The B block of the copolymer can be formed, for example simply by injecting suitable monomer into the reaction vessel and displacing the lithium radical from the just-polymerized A block, which then acts as an initiator because it is still charged. The B block is formed predominantly from substituted or unsubstituted $C_2$-$C_{10}$ dienes, particularly conjugated dienes such as butadiene or isoprene. Other diene, vinyl or olefinic monomers such as chloroprene, 1.4-pentadiene, isobutylene, ethylene or vinyl chloride may be used in the formation of the B block provided that they are present at a level low enough to not alter the fundamental olefinic character of the B block. The B block will be characterized by elastomeric properties which allow it to to absorb and dissipate an applied stress and then regain its shape.

In the A-B-A tri-block copolymer, the second end block A can be formed in a manner similar to the first, by injecting appropriate vinyl aromatic monomer into the reaction vessel. Alternatively, a bivalent lithium initiator can be used, which, when brought together with the diene monomer under the same conditions described above, will form an elastomeric mid block B which carries a charge at each end. Then, upon addition of vinyl aromatic monomer to the reaction mixture, a thermoplastic end block A will form on both ends of the mid block B, yielding a thermoplastic elastomeric A-B-A copolymer.

To reduce oxidative and thermal instability, the block copolymers used herein can also desirably be hydrogenated to reduce the degree of unsaturation on the polymer chain and on the pendant aromatic rings. The block copolymer may be selectively hydrogenated by hydrogenating only the elastomeric block B. Typical hydrogenation catalysts utilized are Raney nickel, molybdenum sulfide, finely divided palladium and platinum oxide. The hydrogenation reaction is typically run at 75°-450° F. and at 100-1,000 psig for 10-25 hours.

The most preferred vinyl aromatic block copolymers are vinyl aromatic/conjugated diene block copolymers formed from styrene and butadiene or styrene and isoprene. When the styrene/butadiene copolymers are hydrogenated, they are frequently represented as styrene/(ethylene/butylene) copolymer in the di-block form, or as styrene/(ethylene/butylene)/styrene copolymer in the tri-block form. When the styrene/isoprene copolymers are hydrogenated, they are frequently represented as styrene/(ethylene/propylene) copolymer in the di-block form, or as styrene/(ethylene/propylene)/styrene copolymer in the tri-block form. The vinyl aromatic/diene block copolymers described above are discussed in greater detail in Holden, U.S. Pat. No. 3,265,766; Haefele, U.S. Pat. No. 3,333,024: Wald, U.S. Pat. No. 3,595,942: and Witsiepe, U.S. Pat. No. 3,651,014, each of which is incorporated herein.

Component (b)(i) in the compositions of this invention is a poly(phenylene ether) [also known as a poly(phenylene oxide), which is a polymer comprising a plurality of structural units described generally by the formula In each of said units independently, each $Q^1$ is independently hydrogen, halogen, primary or secondary $C_1$-$C_8$ lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary $C_1$-$C_8$ lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. It is preferred that any alkyl radicals are straight chain rather than branched. Most often, each $Q^1$ is alkyl or phenyl, especially $C_{1-4}$ alkyl, and each $Q^2$ is hydrogen.

Both homopolymer and copolymer poly(phenylene ether)s are included, as well as mixtures or blends thereof. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units.

Also included are poly(phenylene ether)s containing moieties which modify properties such as molecular weight, melt viscosity and/or impact strength. Such polymers may be prepared by copolymerizing with or grafting onto the poly(phenylene ether), in known manner, such vinyl monomers as vinyl nitrile compounds (e.g. acrylonitrile) and vinyl aromatic compounds (e.g., styrene), or such polymers as polystyrenes and elastomers. The product typically contains both grafted and ungrafted moieties. Other suitable polymers are the coupled poly(phenylene ether)s in which the coupling agent is reacted, in known manner, with the hydroxy groups of two poly(phenylene ether) chains to produce a higher molecular weight polymer containing the reaction product of the hydroxy groups and the coupling agent. Illustrative coupling agents are low molecular weight polycarbonates, quinones, heterocycles, formals and poly(phenylene sulfide)s. For example, poly(phenylene ether)/polycarbonate copolymers are known and are discussed in U.S. Pat. No. 5,010,143. which is incorporated herein.

The poly(phenylene ether) typically has a number average molecular weight within the range of about 3,000–40,000, and a weight average molecular weight within the range of about 20,000–80,000, as determined by gel permeation chromatography. Its intrinsic viscosity is typically in the range of about 0.15–0.6, and preferably at least 0.25, dL/g, as measured in chloroform at 25° C. However, values outside these ranges are permitted as well.

The poly(phenylene ether)s are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of poly(phenylene ether)s by oxidative coupling. For the most part, they contain at least one heavy metal compound such as a copper, manganese or cobalt compound, usually in combination with various other materials.

A first class of preferred catalyst systems consists of those containing a copper compound, such as are disclosed, for example, in U.S. Pat. Nos. 3,306,874, 3,306,875, 3,914,266 and 4,028,341, each of which is incorporated herein. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems.

Poly(phenylene ether)s, as described above, are discussed in greater detail in U.S. Pat. No. 4,866,130, which is incorporated herein in its entirety.

A polystyrene for blending with poly(phenylene ether) to form component (b)(ii) includes polymers prepared by bulk, suspension or emulsion polymerization which contain at least 25 percent by weight structural units derived from a monomer described generally by the formula wherein L is hydrogen, $C_{1-8}$ lower alkyl or halogen, D is vinyl, halogen or lower alkyl, and p is from 0 to 5. These resins include homopolymers of styrene, chlorostyrene and vinyltoluene: random copolymers of styrene with one or more monomers illustrated by acrylonitrile, an alkyl acrylate, butadiene, α-methylstyrene, ethylvinylbenzene, divinylbenzene, maleic anhydride and phenyl maleimide: an ethylene/propylene/diene copolymer grafted with acrylonitrile and/or styrene; and rubber modified polystyrenes comprising blends and grafts, wherein the rubber is a polybutadiene or a rubbery copolymer of about 70–98 percent styrene and about 2–30 percent diene monomer. A polystyrene as described above may also be rubber-modified by blending it with a hydrogenated or unhydrogenated vinyl aromatic/diene block copolymer, containing at least thirty percent vinyl aromatic compound by weight, which yields a high impact polystyrene ("HIPS").

Component (b)(ii) in the compositions of this invention is a poly(phenylene ether) blend which is prepared by blending a poly(phenylene ether) with polystyrene, a vinyl aromatic copolymer, and/or with other non-styrenic polymers, as specified below. The blend constituting component (b)(ii) may be made up of about 20 to about 99 parts poly(phenylene ether), and preferably about 30 to 90 parts poly(phenylene ether). by weight, with the balance being made up of polystyrene, a vinyl aromatic copolymer, and/or the non-styrenic polymers, in addition to additives such as dyes and pigments. A preferred formulation of component (b)(ii) contains about 30 to about 85 weight parts poly(phenylene ether), about 15 to about 70 weight parts selected from one or more of the following: polystyrene, high impact polystyrene, styrene/butadiene/styrene and/or styrene-/ethylene-butylene/styrene block copolymer, and about 0.1 to about 20 weight parts pigments and/or dyes.

It is preferred that the vinyl aromatic copolymer of component (a) be blended with component (b)(ii) in the form of a poly(phenylene ether)/vinyl aromatic copolymer alloy. It is also preferred, but not reqired, that the poly(phenylene ether) be immiscible in the vinyl aromatic copolymer matrix resin such that the poly(phenylene ether) (b) i , or the poly(phenylene ether) which contains a miscible portion of a vinyl aromatic copolymer alloy component [(b)(ii), is dispersed within the matrix resin as particles on the order of about 0.3–10 microns, and more preferably about 0.3–6 microns. The immiscibility of two or more polymers may be determined visually by examination of a transmision electron micrograph of a composition containing them, or by determining whether such composition containing them exhibits more than one glass transition temperature ($T_g$). $T_g$ may be determined, for example, by calorimetry. Particle size may also be determined visually by examination of a transmision electron micrograph.

Figure 1:
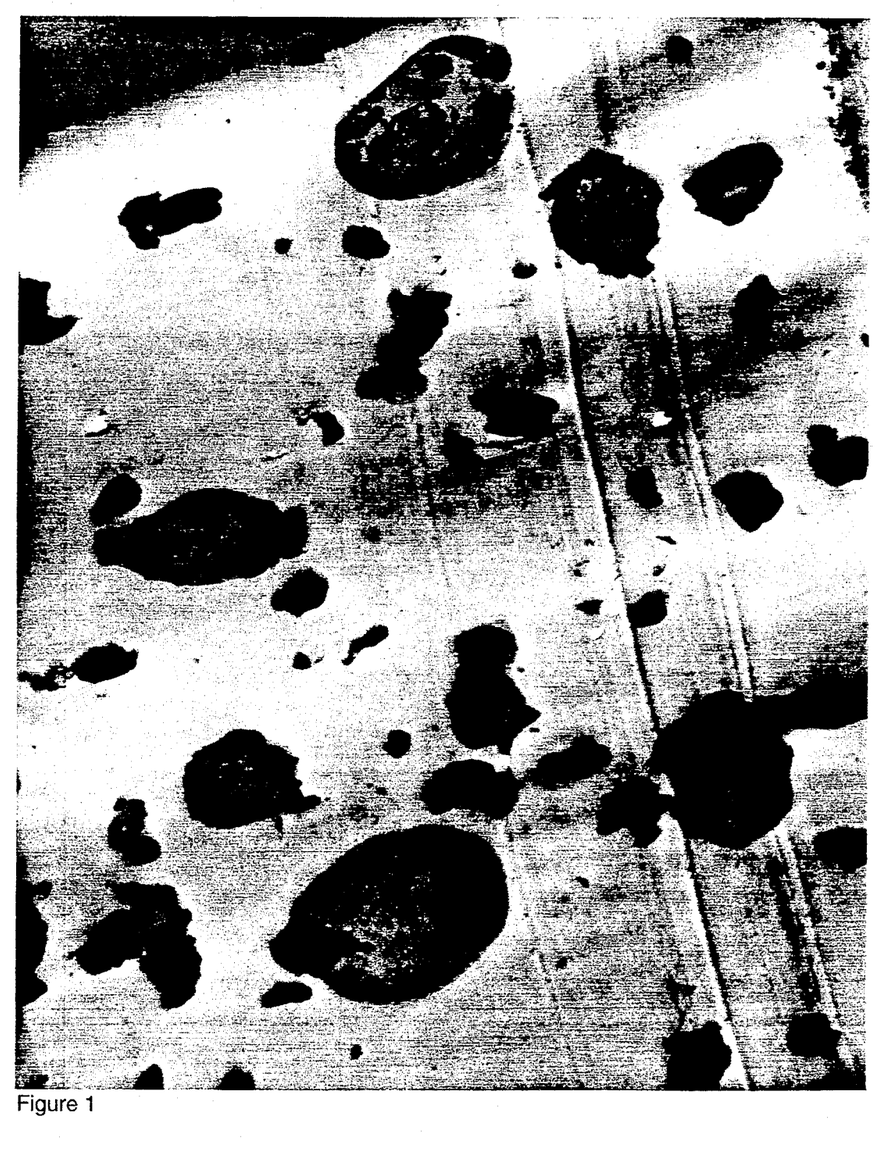
FIG. 1 is a transmission electron micrograph of a composition of styrene/acrylonitrile copolymer and poly(phenylene ether)/styrenic alloy.

In a particularly preferred embodiment, when a vinyl aromatic block copolymer is blended with a poly(phenylene ether) to form component (b)(ii), the vinyl aromatic phase of the block copolymer, although distinguishable from the poly(phenylene ether) phase, resides within the poly(phenylene ether) phase because of the misciblity of the vinyl aromatic block with poly(phenylene ether). For example, FIG. 1 is a transmission electron micrograph of the composition of Example 18 wherein styrene/acrylonitrile copolymer ("SAN") (light gray background) is the matrix resin. Poly(phenylene ether)/styrenic alloy (darker gray spherical particles) is dispersed within the SAN matrix, and, within the poly(phenylene ether)/styrenic alloy, the rubber portion of the miscible styrenic alloy component appears as a spherical inclused mass rubber particle, while styrene/ethylene-butylene/styrene thermoplastic rubber appears as a dark gray mottled polymer. It should be noted that the poly(phenylene ether)/styrenic alloy containing the styrene/ethylene-butylene/styrene thermoplastic rubber is totally immiscible with the SAN matrix resin.

Component (b)(ii) represents a poly(phenylene ether) concentrate because poly(phenylene ether) is typically present in component (b) (ii) at a higher level of content than it will be in the final composition of which component (b) (ii) itself becomes a part. The desired level of content of poly(phenylene ether) in a composition of this invention is reached by diluting the amount of poly(phenylene ether) in the concentrate by the admixture of component (a), and optionally components (c) and/or (d), with component (b)(ii) in the final composition.

The presence of polystyrene and/or a vinyl aromatic copolymer in the blend which constitutes component (b)(ii) reduces the processing temperature and/or viscosity of the poly(phenylene ether) to a level which makes it possible, if desired, to add a poly(phenylene ether) concentrate (b)(ii) in the formation of a composition hereof directly at a molding machine rather than in a pre-molding extruded mixture. A composition of blend components which is to be molded is typically first processed by melt mixing all of the components together in an extruder. The resulting mixture is then re-melted in a molding machine for molding. However, because polystyrene and/or a vinyl aromatic copolymer in a component (b)(ii) blend imparts to the resulting poly(phenylene ether) concentrate a processing temperature and/or viscosity which is lower than that of poly(phenylene ether) by itself, the concentrate may be added to the final composition directly at the molding machine rather than in the pre-molding extruded mixture.

Non-styrenic polymers which can optionally be blended with poly(phenylene ether). polystyrene and/or a vinyl aromatic copolymer as a part of component (b)(ii) are polyamide, polycarbonate, polyester and an acrylate polymer, or a mixture thereof.

The polyamides suitable for use in this invention can be produced by the condensation of bifunctional monomers, typically those containing acid and amine functionalities, where the monomers have either the same or different functional groups. For example, if hexamethylenediamine is reacted with adipic acid, an —[—AAB-B—]— type polyamide is obtained wherein the diamine and diacid units alternate. However, when a monomer such as an amino acid or a cyclic lactam is self-polymerized, an —[—AB—]— type polyamide results from a regular head-to-tail polymerization, similar to an addition mechanism. For example, when nylon-6 is made, heat is applied to raise the temperature of the caprolactam to 240°–280° C., and catalysts such as water and phosphoric acid are added to the system. Hydrolysis ensues, the ring opens and polymerization takes place while unreacted monomer is removed from the system and recycled. Polycondensation and growth of the polymer chain results from the removal of water from the system.

The polyamides suitable for use herein also include those wherein two or more different diamines, and/or different diacids and/or different amino acids are polymerized together to form a random or block copolyamide. The carbon chain between the functional groups may be linear or branched aliphatic, alicyclic or aromatic hydrocarbons. The chains may also contain hetero atoms such as oxygen, sulfur or nitrogen. Also suitable for use herein are block or random copolymers, such as those resulting, for example, from melt mixing two or more different polyamides, from reaction of a diamine or diacid monomer that contains an amide linkage with another diamine or diacid, or from reaction of a diisocyanate with a dicarboxylic acid.

Polyamides are most often prepared by direct amidation in which the amine group of a diamine or an amino acid bonds to the carboxyl of a diacid with the accompanying elimination of water. Derivatives of the acid function, such as an ester, acyl halide or amide, may be used as an alternative source of the carboxyl functionality, in which case the by-product is an alcohol, a hydrogen halide or ammonia, respectively. For example, when an acid chloride is used, the diacid chloride in a water-immiscible solvent can be added to an aqueous solution of the diamine, an inorganic base and a surface active agent, and interfacial polymerization occurs in the organic layer. When polymerization occurs in solution, an organic base such as pyridine is used as the acid acceptor. Formation of polyamides can also occur by ring-opening polymerization of a caprolactam, such as when nylon-6 is made from $\epsilon$-caprolactam. Such a reaction can be run at high temperature, in which case water or an amino acid is used as the initiator, or if it is run at low temperature, the ring opening is effected by a strong base, such as NaOH, usually with the addition of an acylating cocatalyst such as acetic anhydride.

Polyamides as described above, and methods for preparing same, are discussed in greater detail in U.S. Pats. No. 2,071,253, 2,130,523 and 2,130,948, each of which is incorporated as a part hereof.

An aromatic polycarbonate can be prepared from an aromatic dihydroxy compound such as a bisphenol, and a carbonate precursor such as a disubstituted carbonic acid derivative, a haloformate (such as a bishaloformate of a glycol or dihydroxy benzene) or a carbonate ester. These components are often reacted by means of the phase boundary process in which the dihydroxy compound is dissolved and deprotonated in an aqueous alkaline solution and the carbonate precursor is dissolved in an organic solvent. The aqueous alkaline solution has a pH of 7.01 or more and can be formed in water from a caustic soda, such as NaOH, or from other bases such as those included in the alkali metal and alkaline earth metal phosphates, bicarbonates, oxides and hydroxides. These components are often reacted by means of a mixture prepared initially from the aromatic dihydroxy compound, water and a non-reactive organic solvent immiscible with water selected from among those in which the carbonate precursor and polycarbonate product are soluble. Representative solvents include chlorinated hydrocarbons such as methylene chloride, 1,2-dichloroethane, tetrachloroethane, chlorobenzene, and chloroform, to which tetrahydrofuran, dioxane, nitrobenzene, dimethyl sulfoxide, xylene, cresol or anisole may be added, if desired. Caustic soda or other base is then added to the reaction mixture to adjust the pH of the mixture to a level at which the dihydroxy compound is activated to dianionic form. A reducing agent such as sodium sulfite or sodium dithionite can also be advantageously added to the reaction mixture as well.

A carbonate precursor is contacted with an agitated mixture of the aqueous alkaline solution of the dihydroxy compound, and, for such purpose, the carbonate presursor can be bubbled into the reaction mixture in the form of a gas, or can be dissolved and introduced in solution form. The mixture is agitated in a manner which is sufficient to disperse or suspend droplets of the solvent containing the carbonate precursor in the aqueous alkaline solution. Reaction at the interface of the organic and aqueous phases created by such agitation yields the bis(carbonate precursor) ester of the dihydroxy compound. For example, if the carbonate precusor is a carbonyl halide such as phosgene, the products of this initial phase of the process are monomers or oligomers which are either mono- or dichloroformates, or contain a phenolate ion at each terminus These intermediate mono- and oligocarbonates dissolve in the organic solvent as they form, and they can then be condensed to a higher molecular weight polycarbonate by contact with a coupling catalyst of which the following are representative: a tertiary amine such as triethyl amine or dimethyl amino pyridine: a hindered secondary amine such as diisopropyl amine; a cyclic aza compound such as 2,2,6,6-tetramethyl piperidine or 1,2-dimethylimidazole; an amidine or aminoamidine compound such as 1-methyl-2-phenyliminopyrrolidine; an isourea compound such as N,N-dibutyl-N'-phenyl-o-methylisourea; an iminoether or iminocarboxylate compound such as 1-aza-2-methoxy-1-cycloheptene or t-butyl-cyclohexyliminoacetate; or a phosphonium, sulfonium, arsonium or quaternary ammonium compound. Such a catalyst may be added to the reaction mixture before or after it is contacted with a carbonate precursor.

The reaction can be run at a pH of 7.01 to 14, and at a temperature between 0° C.-100° C., although usually not in excess of the boiling point (reflux temperature) of the solvent used. Frequently, the reaction is run at a temperature of about 0° C. to about 45° C.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, direct devolitization in a vented extruder, or precipitation by use of an anti-solvent such as toluene, cyclohexane, heptane, methanol, hexanol, or methyl ethyl ketone.

In the melt process for preparation of polycarbonate, aromatic diesters of carbonic acid are condensed with an aromatic dihydroxy compound in a transesterification reaction in the presence of a basic catalyst such as sodium methylate, sodium bisphenolate, calcium acetate, phenyl benzoate, N-stearoylphenothiazine, quaternary ammonium chloride, an alkaline(hydroxy)-fluoroborte, an alkali metal salt of benzoic acid, an iminocarboxylic acid, or basic metal oxides such as zinc, lead or antimony oxide. The reaction is typically run at 250° C.-300° C. under vacuum at a progressively reduced pressure of 1-100 mm Hg. The reaction is run in the absence of solvent and typically yields lower viscosity grades of polycarbonate.

Aromatic polycarbonate can also be prepared in a homogeneous solution through a process in which a carbonare presursor, such as phosgene, is contacted with a solution containing an aromatic dihydroxy compound, a chlorinated hydrocarbon solvent and a substance, such as pyridine, dimethyl aniline or CaOH, which acts as both acid acceptor and condensation catalyst. Washing with acidified water removes the pyridine and its hydrochloride, and precipitation and repulping with an antisolvent such as heptane followed by filitration and distillation removes oligomers and unreacted monomer.

Yet another process for the preparation of aromatic polycarbonate is the polymerization of cyclic oligomers having a weight average molecular weight of approximately 1,300 at 200° C.-300° C., using a catalyst such as lithium stearate or tetramethylammonium tetraphenylborate.

Examples of some dihydroxy compounds suitable for the preparation of aromatic polycarbonate include variously bridged, substituted or unsubstituted aromatic diols (or mixtures thereof) represented by the formula wherein:
(I) Z is (A) a divalent radical, of which all or different portions can be (i) linear, branched, cyclic or bicyclic, (ii) aliphatic or aromatic, and/or (iii) unsaturated, said divalent radical being composed of 1-35 carbon atoms together with up to five oxygen, nitrogen, sulfur, phosphorous and/or halogen (such as fluroine, chlorine and/or bromine) atoms; or (B) S, $S_2$, SO, $SO_2$, or CO: or (C) a single bond; and (II) each X is independently hydrogen, a halogen (such as fluroine, chlorine and/or bromine), a $C_1$–$C_{12}$ linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy.

For example, the bridging radical represented by Z in the above formula can be a carbon atom to which is bonded one or more groups such as $CH_3$, $C_2H_5$, $C_3H_7$, n-$C_3H_7$, i—$C_3H_7$, cyclohexyl, bicyclo[2.2.1]heptyl, benzyl, $CF_2$, $CF_3$ $CCl_3$, $CF_2Cl$, CN, $(CH_2)_2COOCH_3$, or $PO(OCH_3)_2$. Using a process such as is generally described above, a polycarbonate product can be obtained having a weight average molecular weight, as determined by light scattering or gel permeation chromatography, of 8,000 to 200,000 and preferably 15,000 to 40,000, although values outside these ranges are permitted as well. Molecular weight can be controlled by addition to the reaction mixture of a chain terminator which may be selected from monofunctional substances such as phenols, alcohols, amines, imides, carbonic acid chlorides, sulfonic acid chlorides, benzyltriethyl ammonium chloride, or phenylchlorocarbonates. A chain terminator may be added to the reaction mixture before or after a dihydroxy compound is contacted with a carbonate precursor.

A branched rather than linear polycarbonate molecule can be obtained by adding to the reaction mixture a tri- or polyfunctional monomer such as a tri- or tetrafunctional phenol or carboxylic acid (or a derivative such as an acyl halide or anhydride). a bisphenol containing carboxylic acid side groups, or a nitrogen-containing compound such as cyanuric chloride, or compounds containing a mixture of such groups. Preferred branching agents are trimellitic acid or pyromellitic dianhydride.

The preferred process of this invention is that in which an aromatic polycarbonate is prepared. An aromatic polycarbonate is defined herein with reference to the oxygen atoms, of the one or more dihydroxy compounds present in the polycarbonate chain, which are bonded to a carbonyl carbon. In an aromatic polycarbonate, all such oxygen atoms are bridged by a dihydroxy compound residue some portion of which is an aromatic ring.

Also included within the term "polycarbonate", as used herein, are various copolycarbonates, certain of which can be prepared by incorporating one or more different dihydroxy compounds into the reaction mixture. This can be accomplished by charging the dihydroxy compounds themselves to the reaction mixture either simultaneously or sequentially. If the dihydroxy compounds are added sequentially or added together but have different reactivities toward the carbonate precursor, a segmented or block copolycarbonate will typically result. Different dihydroxy compounds with the same reactivity typically yield a random copolycarbonate when reacted together. Alternatively, if oligocarbonates are formed separately from one or more different dihydroxy compounds, the oligocarbonates can then be coupled in a condensation reaction to yield a segmented or block copolycarbonate. When a dicarboxylic acid (or derivative) or a hydroxycarboxylic acid is used in the reaction mixture, or to form an oligomeric prepolymer, instead of one of the different dihydroxy compounds mentioned above, a poly(ester/carbonate) is obtained.

Copolycarbonates can also be prepared, for example, by reaction of one or more dihydroxy compounds with a carbonate precursor in the presence of a chlorine- or amino-terminated polysiloxane, with a hydroxy-terminated poly(phenylene oxide) or poly(methyl methacrylate), or with phosphonyl dichloride or an aromatic ester of a phosphonic acid. Siloxane/carbonate block copolymers are discussed in greater detail in Paul, U.S. Pat. No. 4,596,970 and poly(ester/carbonate)s are discussed in greater detail in Swart, U.S. Pat. No. 4,105,533.

The methods generally described above for preparing carbonate polymers suitable for use in the practice of this invention are well known: for example, several methods are discussed in detail in Schnell, U.S. Pat. No. 3,028,365; Campbell, U.S. Pat. No. 4,384,108; Glass, U.S. Pat. No. 4,529,791; and Grigo, U.S. Pat. No. 4,677,162, each of which is incorporated as a part hereof.

The polyester useful for blending with poly(phenylene ether) to form component (a) may be made by the self-esterification of hydroxycarboxylic acids, or direct esterification, which involves the reaction of a diol with a dicarboxylic acid with the resulting elimination of water, giving an —[—AABB—]— polyester. Temperatures applied exceed the melting points of the reactants and typically approach the boiling point of the diol being used, and usually range from about 150° C. to about 280° C. An excess of the diol is typically used, and once all of the acid has reacted with diol, the excess diol is removed by distillation with the application of additional heat under reduced pressure.

Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium, zinc, calcium, magnesium or aluminum, whereas catalysts such as antimony oxide, titanium butoxide or sodium acetate are often used when acidolysis occurs in the interchange reaction. Diol derivatives such as an acetate can be used effectively when it is desired to conduct acidolysis.

The molecular weight of polyester can be increased by adding a chain coupling agent, such as diphenyl carbonate, to the melt reaction mixture just prior its completion. Or, to achieve higher weight by solid state polymerization, polyester product of intermediate weight can be heated in a vacuum or stream of inert gas, first to a temperature where it crystallizes and then to a temperature close to its melting point.

Polyesters can also be produced by a ring-opening reaction of cyclic esters or lactones, for which organic tertiary bases and alkali and alkaline earth metals, hydrides and alkoxides can be used as initiators.

Whether a polyester is crystalline or amorphous is typically a function of the symmetry of the starting materials from which it is made. When one or more hydrogens on the diol and/or the diacid (or derivative) which are reacted to form a polyester are replaced by larger radicals such as alkyl or halogen, the intermolecular spacing of the resulting molecules may be disrupted if the presence of the substituent creates asymmetric or irregularly shaped molecules. The component containing the substituent may also be combined into the polyester molecule in random orientation, resulting in structural irregularity in the polymer chain. Factors which can influence crystallization of ring-containing polyesters are the directionality of the ester groups, the stereochemistry of the rings and variations in symmetry where the rings are bridged. For example, a poly(alkylene isophthalate) crystallizes only with difficulty, and a polyester prepared from phthalic acid typically does not crystallize at all. However, where the amount of monomer containing the asymmetry is small in relation to the remainder of the starting materials, the portion of the resulting polyester molecule which suffers from structural irregularity will also be small, and crystallization will typically not be impeded. A crystalline material may be identified by the endotherm it displays on a differential scanning calorimeter. A preferred polyester for use in this invention is a crystalline polyester having a melting point of 254°–260° C.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene phenylenedicarboxylate), a poly(phenylene alkanedicarboxylate), or a poly(phenylene phenylenedicarboxylate) is therefore appropriate for use herein. Alkyl portions of the polymer chain can be substituted with, for example, halogens, alkoxy groups or alkyl side chains and can contain divalent heteroatomic groups such as —O—, —S— or —SO$_2$—) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms.

Typical alkylene diols used in ester formation are the $C_2$–$C_{10}$ glycols, such as ethylene-, propylene-, and butylene glycol. Alkanedicarboxylic acids frequently used are oxalic acid, adipic acid and sebacic acid Diols which contain rings can be, for example, a 1,4-cyclohexylenyl glycol or a 1,4-cyclohexane-dimethylene glycol, resorcinol, hydroquinone, 4,4′-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethylol together with ethylene glycol in esterification with terephthalic acid forms a clear, amorphous copolyester ("PETG") of particular interest. Also contemplated are PCTG: liquid crystalline polyesters derived from mixtures of 4-hydroxybenzoic acid and 2-hydroxy-6-naphthoic acid: or mixtures of terephthalic acid, 4-hydroxybenzoic acid and ethylene glycol: or mixtures of terephthalic acid, 4-hydroxybenzoic acid and 4,4′-dihydroxybiphenyl.

Aromatic polyesters, those prepared from an aromatic diacid, such as the poly(alkylene phenylenedicarboxylates) polyethylene terephthalate and polybutylene terephthalate, or mixtures thereof, are particularly useful in this invention.

Methods and materials useful for the production of polyesters, as described above, are discussed in greater detail in Whinfield, U.S. Pat. No. 2,465,319, Pengilly, U.S. Pat. No. 3,047,539 and Russell. U.S. Pat. No. 3,756,986, each of which is incorporated herein by reference.

An acrylate polymer is defined as a polymer prepared by homopolymerization of an alkyl acrylate or an alkyl methacrylate or by copolymerization of a mixture of the two: and includes a mixture of any such homopolymers or copolymers.

An alkyl acrylate or methacrylate can be prepared, for example, by reaction of an alkyl alcohol or diazoalkane with acrylic or methacrylic acid. Acrylic acid is prepared by the vapor phase oxidation of propylene. The acrylic acid/alcohol esterification reaction can be run at about 80° C. using an acid catalyst such as $H_2SO_4$. Methacrylic acid may be prepared by the oxidation of isobutylene or t-butyl alcohol. A methacrylate may also be prepared by reacting acetone cyanohydrin with an excess of concentrated sulfuric acid to form methacrylamide sulfate, which, when then reacted with an alcohol, yields a methacrylate. A $C_1$–$C_{10}$ acrylate or methacrylate may be used for polymer preparation herein, with $C_1$–$C_6$ acrylate or methacrylate being preferred, and $C_1$–$C_4$ being more preferred.

The acrylate polymer useful in the compositions of this invention can be prepared in a polymerization reaction initiated by free radical initiators such as azo compounds or peroxides, preferably in the absence of oxygen. Methacrylate monomers are most often polymerized in bulk, but this method has little application for acrylate monomers. Acrylate and methacrylate monomers may be polymerized in an organic solution, using, for example, an aromatic hydrocarbon, ester, ketone or chlorohydrocarbon (such as toluene, chlorobenzene or 3-pentanone) as the solvent. A chain transfer agent such as a thiol may be used to control molecular weight. Polymerization can also occur in an aqueous emulsion in which an anionic surfactant, such as an alkylarene sulfate or phosphate, a nonionic surfactant, such as an alkyl or aryl polyoxyethylene, or a cationic surfactant is used. Suspension polymerization is used primarily for methacrylates and involves suspending in water 0.1–5 mm droplets of monomer which are stabilized by a protective colloid such as cellulose, poly(vinyl alcohol), gelatin or talc. The initiator should be soluble in the monomer but not in water. Acrylates and methacrylates can also be polymerized in a non-aqueous dispersion using an organic diluent such as hexane or methanol.

When an acrylate and a methacrylate are copolymerized, the acrylate, each can be used in the mix of reactants from which the copolymer results in an amount of up to about 99.0 parts by weight, based on the total weight of the copolymer. When the acrylate polymer takes the form of a copolymer, the copolymer may be a random, alternate, block or grafted copolymer.

An elastomeric impact modifier may optionally be used in the compositions of this invention as component (c). The elastomeric impact modifier suitable for use herein typically has a glass transition temperature ("Tg") less than 10° C., and preferably less than −5° C., and is effective for the purpose of imparting enough flexibility and freedom of chain rotation to a composition of this invention to improve its toughness: reduce its notch sensitivity; and enable it, in response to the deformation of an applied stress, to recover with stored modulus rather than fracture. The rubber content of the impact modifier employed in the compositions of this invention can be up to 80 percent, but is preferably greater than 40 percent, and a mixture of two or more elastomeric substances can be used as the impact modifier.

Illustrative examples of elastomeric impact modifiers useful in the compositions of this invention are thermoplastic elastomers, emulsion-type, core-shell graft copolymer elastomers, and olefinic elastomers.

Thermoplastic elastomers are those which are characterized, for example, in that they can be melted and recooled, or dissolved and reformed upon removal of the solvent, without undergoing any significant change in properties. Thermoplastic elastomers are also characterized by the randomness of the shape and size they take on when mixed by shearing forces with the other components making up the compositions of this invention, especially when heat is applied during such mixing. Because thermoplastic elastomer is typically a long chain molecule, segments of a thermoplastic elastomer in the polymer composition matrix are generally elongated, linear ribbons or bands. The molecules tend to fuse and flow together in a continuous structure. However, chain coiling can yield globule-shaped segments of thermoplastic elastomer in the matrix.

The random shape and size assumed in the polymer compositon matrix by a thermoplastic elastomer is to be distinguished from the shape and size assumed by a core-shell graft copolymer. A core-shell graft copolymer is typically present in the polymer matrix in a bead shape both before and after mixing by application of shearing forces, whether heat is used or not, and is usually present in a rather narrow size range, for example 0.05–0.8 microns. The retention of this core-shell, or spherical, shape by the graft polymer, even after heating and mixing, results from the fact that the outer layers, which surround the core, are formed by grafting appropriate monomers onto the core. A core-shell graft copolymer typically cannot be melted and recooled without a significant change in properties because the graft polymer will tend to decompose or crosslink, and the bead-shaped segments of graft polymer will tend to agglomerate upon melting, making dispersion of them by mixing difficult.

Thermoplastic elastomers include, for example, an SBR rubber, which is a copolymer of styrene and butadiene typically containing about 23% styrene. The monomers themselves can be randomly dispersed along the backbone, or blocks of each monomer can be randomly dispersed. Thermoplastic elastomers also include the di-block ("A—B") copolymers and the tri-block ("A—B—A") copolymers discussed above with relation to vinyl aromatic copolymers for use in blending with poly(phenylene ether) to form component (b) (ii).

Linear, branched, radial or teleblock A—B—A or A—B block copolymer thermoplastic elastomers can also be prepared from materials other then vinyl aromatic systems. These other copolymers also have a rigid block "A" having a Tg above room temperature (approximately 23°–25° C.) and a rubbery block "B" having a Tg below room temperature. Examples of typical pairings of the various materials used to form the respective A and B blocks of such other block copolymer thermoplastic elastomers are shown below in Table 1.

TABLE I

| Block Copolymer Pairings | |
| --- | --- |
| A block | B block |
| polyethylene | ethylene/butylene copolymer |
| polyurethane | polyester polyether |
| polyester | polyether |
| polypropylene | EPDM rubber |

Block copolymer thermoplastic elastomers can be prepared, for example, by anionic polymerization using an alkyl-lithium initiator. Thermoplastic elastomers based on urethane are discussed in greater detail in Schollenberger, U.S. Pat. No. 3,015,650 and Saunders, U.S. Pat. No. 3,214,411; and those based on copolyester-ether are discussed in Witsiepe, U.S. Pat. No. 3,651,014, each of which is incorporated herein.

Representative examples of the core-shell graft copolymer elastomers suitable for use herein are those which can be based on either a diene rubber, an acrylate rubber or on mixtures thereof.

A diene rubber contains a substrate latex, or core, which is made by polymerizing a diene. preferably a conjugated diene, or by copolymerizing a diene with a mono-olefin or polar vinyl compound, such as styrene, acrylonitrile, or an alkyl ester of an unsaturated carboxylic acid such as methyl methacrylate. The substrate latex is typically made up of about 40–85% diene, preferably a conjugated diene, and about 15–60% of the mono-olefin or polar vinyl compound. The elastomeric core phase should have a glass transition temperature ("Tg") of less than about 10° C., and preferably less than about −20° C. A mixture of ethylenically unsaturated monomers is then graft polymerized to the substrate latex. A variety of monomers may be used for this grafting purpose, of which the following are exemplary vinyl compounds such as vinyl toluene or vinyl chloride: vinyl aromatics such as styrene, alpha-methyl styrene or halogenated styrene: acrylonitrile, methacrylonitrile or alpha-halogenated acrylonitrile; a $C_1$–$C_8$ alkyl acrylate such as ethyl acrylate or hexyl acrylate: a $C_1$–$C_8$ alkyl methacrylate such as methyl methacrylate or hexyl methacrylate: glycidyl methacrylate: acrylic or methacrylic acid: and the like or a mixture of two or more thereof.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer ("MBS" rubber) is about 60–80 parts by weight substrate latex, about 10–20 parts by weight of each of the first and second monomer shells. A preferred formulation for an MBS rubber is one having a core built up from about 71 parts of butadiene, about 3 parts of styrene, about 4 parts of methyl methacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A diene-based, core-shell graft copolymer elastomer and methods for making same, as described above, are discussed in greater detail in Saito, U.S. Pat. No. 3,287,443, Curfman, U.S. Pat. No. 3,657,391, and Fromuth, U.S. Pat. No. 4,180,494.

An acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2$-$C_6$, most preferably butyl acrylate. The elastomeric core phase should have a Tg of less than about 10° C., and preferably less than about −20° C.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Ethylenically unsaturated monomers such as glycidyl methacrylate, or an alkyl ester of an unsaturated carboxylic acid, for example a $C_1$-$C_8$ alkyl acrylate like methyl acrylate, hydroxy ethyl acrylate or hexyl acrylate, or a $C_1$-$C_8$ alkyl methacrylate such as methyl methacrylate or hexyl methacrylate, or mixtures of any of the foregoing, are some of the vinyl monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 40% to about 95% by weight of an elastomeric core and about 60% to about 5% of a rigid thermoplastic phase. The elastomeric core can be polymerized from about 75% to about 99.8% by weight $C_1$-$C_6$ acrylate, preferably n-butyl acrylate. The rigid thermoplastic phase can be polymerized from at least 50% by weight of $C_1$-$C_8$ alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928.

Core-shell grafted copolymeric elastomers also include a vinyl nitrile/diene/vinyl aromatic copolymer, as described above with relation to the vinyl aromatic copolymers includable in component (b) (ii), having an elastomeric core which is greater than 40 percent by weight of the copolymer.

Olefinic elastomers useful as an impact modifier in the compositions of this invention are based generally on a long-chain, hydrocarbon backbone, which may or may not be grafted with one or more vinyl monomers. Representative examples of a few olefinic elastomers which illustrate the variation in the known substances which would suffice for such purpose are as follows butyl rubber: chlorosulfonated polyethylene rubber; ethylene/propylene copolymer and ethylene/propylene/diene copolymer, which may be grafted with one or more vinyl monomers: fluorinated olefins, including polytetrafluoroethylene; neoprene rubber: nitrile rubber: polybutadiene and polyisoprene.

The olefinic elastomer used herein may also contain reactive moieties. A reactive olefinic elastomer may, for example, be a polymer which has a glass transition temperature (Tg) less than 0° C. formed from (I) (A) at least one olefin monomer such as ethylene, propylene, isopropylene, butylene or isobutylene, or at least one conjugated diene such as butadiene, and the like, or mixtures thereof, or (B) a copolymer of one or more olefin monomers, such as described above, with other vinyl monomer(s), but containing a sufficient amount of the olefin monomer(s) to impart a Tg of less than 0° C. to the reactive olefinic elastomer: (II) at least one vinyl (i.e. olefinically unsaturated, including vinylidene) or olefin monomer carrying at least one epoxide group; and, optionally, (III) at least one vinyl (i.e. olefinically unsaturated, including vinylidene) monomer not carrying an epoxide group.

Representative vinyl (i.e. olefinically unsaturated, including vinylidene) monomers useful as the optional component (III) in forming the polymeric reactive olefinic elastomer useful in this invention include the following: vinyl compounds (especially when they bear a polar, electronegative group or functionality) such as vinyl toluene, alphamethyl styrene, halogenated styrene; those containing nitrile groups such as copolymers of acrylonitrile, methacrylonitrile or alpha-halogenated acrylonitrile; a $C_1$-$C_8$ alkyl acrylate or methacrylate such as ethyl acrylate, butyl acrylate, hexyl acrylate, hydroxy ethyl acrylate, methyl methacrylate or hexyl methacrylate; acrylic or methacrylic acid: the vinylidene monomers, especially when they bear a polar, electronegative group or functionality such as a halogen group, or an organic group having a double or triple bond such as phenyl, carboxy, cyano or the like; vinyl esters or vinyl ethers: maleimides: mononitriles having alpha-beta-olefinic unsaturation and lower alkyl or halogen substituents; aliphatic vinyl compounds such as vinyl chloride, vinylidene chloride, amides and nitriles, vinyl acetate, vinyl propionate and vinyl benzoate; vinyl-methyl-ether, vinyl-ethyl-ether and vinyl-isobutyl-ether: and vinyl aromatic compounds such as styrene, alpha -methyl styrene, vinyl toluene, vinyl xylene, p-ethylstyrene, 2,4-dimethyl styrene, o-chlorostyrene and 2,5-dichlorostyrene: vinyl esters; vinyl ethers; alpha-olefins; the maleates: the fumarates; and the like; or mixtures of two or more of any of the foregoing. In general, vinyl and vinylidene monomers from groups such as the vinyl and vinylidene - esters, -ethers, -organic acids, -aromatics, -alcohols. -anhydrides, -halides, -nitriles and -amides; or mixtures of any of the foregoing may be used. Additionally, any one or more of the foregoing monomers may be copolymerized with carbon monoxide.

Vinyl monomers such as the foregoing may also be copolymerized as part of the olefin copolymer described above as component (I)(B): or, when carrying an epoxide group, may be used as the component (II).

Or, the epoxide group may be carried on an olefin monomer.

Suitable olefinically unsaturated monomers containing epoxide groups for use as component (II) of the terpolymeric reactive olefinic elastomer include, for example, glycidyl esters of unsaturated carboxylic acids (glycidyl methacrylate); glycidyl ethers of unsaturated alcohols (allyl-glycidyl-ether) and of alkenylphenols (isopropenylphenyl-glycidylether): and vinyl and allyl esters of epoxycarboxylic acids (vinyl esters of epoxidized oleic acid). In general, all compounds which contain both a polymerizable unsaturated group and reactive epoxide groups in the molecule can be used for preparation of the reactive olefinic elastomer of the invention.

Copolymers of 1-25 percent (by weight) of glycidyl methacrylate, 40-95 percent of ethylene, and 4-40 percent of vinyl acetate are particularly suitable for use herein as the polymeric reactive olefinic elastomer. When the optional component (III) is not present in the reactive olefinic elastomer, a copolymer of 1-25 percent (by weight) of glycidyl methacrylate, 75-99 percent of ethylene is preferred.

Copolymers containing epoxide groups may be obtained according to known processes, for example by radical polymerization in chlorobenzene at 80° C. in 50% strength solution.: For instance, monomers such as listed above are dissolved in an appropriate solvent, such as benzene, chlorobenzene or toluene, and polymerized at a temperature of about 80° C. by adding azobisisobutyronitrile, whereby oxygen is excluded. After the monomers have been reacted, the solvent used is distilled off (e.g., chlorobenzene at 100° C. and 20 torr) and the residue is dried in vacuum at 100° C. and then powdered. The terpolymeric reactive olefinic elastomer of this invention can also be prepared in gas phase under conditions suitable for polymerizing an olefin. For example, the terpolymer can be made in either a tubular reactor or a stirred autoclave, where heated, pressurized feed streams of olefin or vinyl monomer gas, peroxide free-radical initiator and chain transfer agent are injected into the reaction device. The reaction of formation usually occurs at 1,500–3,000 atm (152–304 MPa) and at a temperature usually not exceeding 300° C., as known in the art.

The molecular weight of the reactive olefinic elastomer is typically between about 10,000 and about 500,000, preferably between about 30,000 and about 200,000, and it typially contains about 5 to about 1,000, preferably about 20 to about 500, epoxide groups per macromolecule.

Various thermoplastic molding polymers (including rubber-modified polymers) may optionally be used as component (d) in the compositions of this invention. These polymers include polyester, polystyrene, polyamide, polyolefin, poly(vinyl chloride), polyurethane and polyacetal, and a mixture of any of said thermoplastic molding polymers may also be used as component (d). Polystyrene, polyester and polyamide have been described above.

A polyolefin may be any of the several different kinds mentioned below including, for example, linear low density polyethylene ("LLDPE"). LLDPE is formed under the kind of low pressure conditions which are usually employed for forming high density polyethylene ("HDPE"). However, a low density product (0.910–0.940 g/cm$^3$) results because, rather than forming a homopolymer, ethylene is copolymerized with one or more c-olefins, which in the final product take on the form and function of short side chains. Because the comonomers most frequently used are α-olefins such as 1-butene, 4-methyl-1-pentene, 1-hexene or 1-octene, these side chains do prevent the close, fully crystalline type of packing representative of HDPE, but they are not nearly as long as the fully branched, long side chains associated with low density polyethylene ("LDPE") made under high pressure conditions.

LLDPE can be formed in a slurry using a light hydrocarbon diluent and a supported chromium catalyst, or it can be formed as a slurry in hexane using organometal-titanium type catalysts. It can also be formed in cyclohexane in solution at a relatively high temperature, approximately 250° C., using as a catalyst a combination of tributyl aluminum, titanium tetrachloride and vanadium oxychloride. LLDPE can also be formed in gas phase using a fluidized bed of growing polymer particles to which a supported chrominum oxide catalyst modified with titanium and fluoride is charged, as described in Levine, U.S. Pat. No. 4,011,382 (incorporated herein), or by a gas-phase process using a stirred but non-fluidized bed and a supported titanium catalyst-triethylaluminum cocatalyst as described in Jezl, U.S. Pat. No. 4,129,729 (incorporated herein).

LDPE is typically thought of as that which is made under high pressure conditions and has a density between about 0.916 to about 0.930 g/cm$^3$. This low density results from the many zones of amorphous arrangement which are characteristic of LDPE because of its long chain branches, which can contain thousands of carbon atoms. LDPE can be made in either a tubular reactor or a stirred autoclave, where heated, pressurized feed streams of ethylene gas, peroxide free-radical initiator and chain transfer agent are injected into the reaction device. The reaction of formation usually occurs at 1,500–3,000 atm (152–304 MPa) and at a temperature usually not exceeding 300° C., as known in the art. LDPE can be copolymerized with monomers such vinyl acetate, ethyl acrylate, acrylic acid or other polar vinyl monomers.

An HDPE homopolymer is typically about 94% crystalline and has a density of about 0.950 to about 0.970 g/cm$^3$. HDPE, because of its much greater crystallinity and density, has a higher melting point than LDPE—135° C. vs. 115° C. The molecular weight of HDPE usually ranges from 50,000 to 1,000,000 or more. One process for making HDPE involves polymerization at about 100°–150° C. and at about 2–4 MPa (290–580 psi) using a chromium oxide-promoted silica catalyst. HDPE is also manufactured in a slurry system wherein high purity ethylene is fed to a loop reactor which contains a low boiling hydrocarbon used to dissolve the ethylene, and to suspend the catalyst and polymer particles. The temperature is typically between about 70°–110° C. and the pressure is typically between about 1 and 5 MPa. A chromium catalyst on a powdered silica substrate is typically used. As the polymer particles are formed they are removed from the reactor in a concentrated slurry and are discharged into a flash tank for drying. Alternatively, HDPE can be made in a gas-phase process wherein no hydrocarbon diluent is used and a fluidized bed is used to agitate and suspend the polymer particles. Methods for making HDPE are more particularly described in Hogan, U.S. Pat. No. 2,825,721 (incorported herein).

Ziegler process polyethylene ("ZPE") has great versatility because of the wide range of molecular weights in which it can be prepared using the versatile Ziegler catalyst. ZPE can include, for example, waxes ranging in molecular weight from 10,000 to ultrahigh molecular weight HDPE having a molecular weight of several million. ZPE has a density of about 0.940 to about 0.965 g/cm$^3$. Both supported and non-supported magnesium-titanium catalyst systems find wide use in the manufacture of ZPE, for example the magnesium dialkyls described in Birkelbach, U.S. Pat. No. 4,120,820 (Dow). Another group of Ziegler catalysts useful in making polyethylene are those formed by the reaction of organosilols with chromium trioxide, such as described in Baker, U.S. Pat. No. 3,324,101 (Union Carbide). Ziegler catalysts can be successfully used in suspension, or slurry, systems where the temperature is kept below 110° C. and is run at about 0.5 to 2 MPa to avoid solution in the diluent. In solution polymerization, the system is operated at about 150°-250° C. and at about 2-4 MPa. Gas-phase polymerization, which is run at 70°-110° C. and at 2-3 MPa, does not use a hydrocarbon solvent or diluent.

The preparation of polypropylene also involves the use of Ziegler catalysts, which allows the stereo regular polymerization of propylene to form isotactic polypropylene. The catalyst used is typically a titanium trichloride in combination with aluminum diethylmonochloride, as further described in Cecchin, U.S. Pat. No. 4,177,160 (incorporated herein). The various types of polymerization processes used for the production of polypropylene include the slurry process, which is run at about 50°-90° C. and 0.5-1.5 MPa (5-15 atm), and the gas-phase and liquid-monomer processes, in which extra care must be given to the removal of amorpohous polymer. Functionalized polypropylene, containing functional groups such as maleic anhydride or acrylic acid, is also suitable for use herein.

Various higher olefins can be homopolymerized to form polyolefins using Ziegler-Natta catalysts, among them 1-butene and 4-methyl-1-pentene. 1-Butene is polymerized in solution using an aluminum-reduced TiCl$_3$ catalyst with diethylaluminum chloride as the cocatalyst, as described in Edwards, U.S. Pat. No. 3,362,940 (incorporated herein). 4-Methyl-1-pentene is prepared by the dimerization of propylene in slurry at about 180° C. and 6-7 MPa, as further described in Hashimoto, U.S. Pat. No. 3,950,450 (incorporated herein).

Poly(vinyl chloride) is prepared, for example, by mass or suspension polymerization. In suspension polymerization, liquid monomer is dispersed under pressure in an aqueous solution containing a protective colloid and a monomer-soluble free radical initiator, such as a diacetyl peroxide or an alkyl peroxyester. Polymerization ensues when the reaction mixture is heated to 50°-75° C. Other vinyl monomers can also be copolymerized along with the vinyl chloride monomer.

A polyurethane is typically prepared from a formulation of a polyisocyanate or diisocyanate "A" component, and an active-hydrogen-containing "B" component such as a polyol, polythiol or a polyamine or a combination thereof.

Polyurethane components which are preferred include those containing methylene diphenyldiisocyanate (MDI), polymeric MDI (PMDI), MDI prepolymers, and modified MDI. However, any kind of di- or polyisocyanate can be used to prepare a polyurethane for use in the present invention. These materials include but are not limited to aliphatic, cycloaliphatic and preferably multivalent isocyanates such as 1,6-hexamethylenediisocyanate; 1-isocyanato-3,5,5-trimethyl-hexahydrotoluenediisocyanate, as well as the corresponding isomeric mixtures 4,4'-, 2,2'- and 2,4'-dicyclohexylmethanediisocyanate, as well as the corresponding isomeric mixtures; 2,4- and 2,6-toluenediisocyanate and the corresponding isomeric mixtures.

As stated hereinabove MDI based materials are preferred. These materials include 4,4'-, 2,4'- and 2,2'-diphenylmethanediisocyanate and the corresponding isomeric mixtures: mixtures of 4,4'-, 2,4'- and 2,2'-diphenylmethanediisocyanates and PMDI: and mixtures of PMDI and toluene diisocyanates. Mixtures of MDI and MDI based materials with any other isocyanate group containing material can be used in the present invention.

Also advantageously used for the isocyanate starting materials in polyurethane preparation are the so-called modified multivalent isocyanates, i.e., products which are obtained through chemical reactions of the above diisocyanates and/or polyisocyanates. Exemplary are polyisocyanates containing esters, ureas, biurets, allophanates and preferably carbodiimides; isocyanurate and/or urethane group containing diisocyanates; and/or polyisocyanates. Individual examples are aromatic polyisocyanates containing urethane groups, preferably having isocyanate group contents of from about 2 to about 40 weight percent, more preferably about 20 to 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Suitable also are prepolymers containing isocyanate (NCO) groups, having NCO contents of from 2 to 30 weight percent, more preferably from 15 to 25 weight percent. Liquid polyisocyanates containing carbodiimide groups and/or isocyanurate rings, having NCO contents of from 8 to 40 weight percent, more preferably from 20 to 35 weight percent, can also be used.

The active hydrogen containing compounds useful for preparing a polyurethane are generally known and are described in such publications as *High Polymers*, Vol. XVI, "Polyurethanes, Chemistry and Technology" by Saunders and Frisch, Interscience Publishers, New York, Vol. I, pp. 32-42, 44-54 (1962) and Vol. II, pp. 5-6, 198-199 (1964 ; *Organic Polymer Chemistry* by K. J. Saunders, Chapman and Hall, London, pp. 323-325 (1973): and *Developments in Polyurethanes*, Vol. I, J. M. Burst, ed., Applied Science Publishers, pp. 1-76 (1978). Preferred are compounds such as dipropylene glycol, ethylene glycol, diethyltoluenediamine polyol, polyether diols and triols, polyester diols and triols, mixtures of the above and the like. However, any active hydrogen containing compound can be used with the method of this invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also preferred are poly(oxypropylene) glycols, poly(oxybutylene) glycols, triols, tetrols and hexols and any of these that are capped with ethylene oxide. These polyols also include poly(oxypropylene-oxyethylene)-polyols. The oxyethylene content should preferably comprise less than about 80 weight percent of the total and more preferably less than about 40 weight percent. The ethylene oxide, when used, can be incorporated in any way along the polymer chain, for example, as internal blocks, terminal blocks, or randomly distributed blocks, or any combination thereof.

The base polyols described hereinabove can contain small amounts of "inherent" unsaturation, i.e., unsaturation due to the isomerization of propylene oxide to allyl alcohol during the manufacture of the polyol. In some cases it may be desirable to include additional unsaturation in the polyols for graftin purposes.

Polyamines, amine-terminated polyols, polymercaptans and other isocyanate-reactive compounds are also suitable in the present invention. Polyisocyanate polyaddition active hydrogen containing compounds (PIPA) are particularly preferred for use with the present invention. PIPA compounds are typically the reaction products of TDI and triethanolamine. A method for preparing PIPA compounds can be found in, for example, U.S. Pat. No. 4,374,209, issued to Rowlands.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol. Polyurethane formulations containing the above compounds are commonly commercially available.

A polyacetal is a polymer which arises by the bond opening and polymerization of the carbonyl group of an aldehyde.

A variety of flame or ignition resistance additives may be advantageously included in the compositions of this invention. Representative examples thereof include antimony oxides: sodium antimonate; metal borates (particularly zinc); boric acid; alumina trihydrate: ammonium fluoroborate; molybdenum oxide: halogenated hydrocarbons; decabromomdiphenyl oxide; 1,2-bis(2,4,6-tribromophenoxy) ethane: halogenated carbonate oligomers; halogenated diglycidyl ethers; tetrabromo phthalic anhydride; inorganic phosphorous compounds such as ammonium phosphates; organophosphorous compounds such as alkyl acid phosphates, trialkyl phosphates (such as triethyl), dimethyl methyl phosphonate, halogenated alkyl phosphates and phosphonates such as 1,3-dichloro-2-propanol phosphate, diphosphates, 3,9-diphosphaspiro(5.5)undecane-3,9-dioxide, oligomeric cyclic and phenyl phosphonates (including halogenated), trisaryl phosphates (including halogenated), phosphine oxides: poly(tetrafluoroethylene); and metal salts of aromatic sulfur compounds such as sulfates, bisulfates, sulfonates, sulfonamides and sulfimides; and others as set forth in Laughner, U.S. Pat. No. 4,786,686, which is incorporated herein.

A variety of other additives may be used in the compositions of this invention for protection against thermal, oxidative and ultra-violet degradation. Representative of the thermal and oxidative stabilizers which can be advantageously utilized are hindered phenols, hydroquinones, phosphites, including substituted members of those groups and/or mixtures of more than one thereof. A preferred phenolic anti-oxidant is Irganox TM 1076 anti-oxidant, available from Ciba-Geigy Corp. Ultraviolet stabilizers such as various substituted resorcinols, salicylates, benzotriazoles, benzophines, hindered amines and hindered phenols can also be usefully included in the compositions hereof, as can be lubricants, colorants, fillers such as talc, clay, phosphate, metal, inorganic or graphite fibers, or mica, dyes, pigments, mold release agents, and reinforcement agents such as fiberglass or phosphate, metal, inorganic or graphite fibers. Additives and stabilizers of the same or a similar kind as the foregoing are known, and the use and selection thereof is within the skill in the art. However, such additives, if used, typically do not exceed 15 percent by weight of the total composition, except fillers or reinforcing agents, which may constitute up to 40 percent of the composition.

To illustrate the practice of this invention, examples of several preferred embodiments are set forth below. It is not intended, however, that these examples (Examples 1–27) should in any manner restrict the scope of this invention. Some of the particularly desirable features of this invention may be seen by contrasting the characteristics of Examples 1–27 with those of various controlled formulations (Control A–K) which do not possess the features of, and are not therefore embodiments of, this invention.

The vinyl aromatic copolymer compositions prepared in Controls A–K and Examples 1–27 are made by dry blending the ingredients thereof and agitating same in a paint shaker for 7 minutes. The dry blended formulations are then melt mixed in a vented 30 mm Werner-Pfleiderer co-rotating, twin screw extruder using a 250 rpm speed and a set temperature of 240°–280° C. Each extruded composition is passed through a water bath, chopped into granules and collected for molding. Granules are thoroughly dried in a circulated air oven at 85° C. for 4 to 6 hours prior to molding. All testing samples are prepared by injection molding on a 75 ton ($6.8 \times 10^4$ kg) Arburg molding machine. Molding temperatures for the barrel and mold are set at 240°–260° C. and 130°–150° F., respectively. Testing samples for gloss measurement are molded in the form of a 2.5 in × 6.5 in plaque.

The formulations of the styrenci copolymer compositions of Controls A–K and Examples 1–27 are given below in Tables 11, III, IV, V and VI in parts by weight of the total composition. In Tables II, 111, IV. V and VI:

"PC" is a polycarbonate having a melt flow rate of 10, as determined according to ASTM Designation D 1238-89, Condition 300/1.2 (molecular weight of approximately 28,000), available from The Dow Chemical Company:

"PPE I" is Noryl TM N-300 poly(phenylene ether)/styrenic polymer alloy having a heat deflection temperature under load of 300° F., available from General Electric Company:

"PPE II" is Noryl™ N-225 poly(phenylene ether)/styrenic polymer alloy having a heat deflection temperature under load of 225° F., available from General Electric Company;

"PPE III" is Noryl™ N-190 poly(phenylene ether)/styrenic polymer alloy having a heat deflection temperature under load of 190° F., available from General Electric Company;

"PPE IV" is Noryl™ GTX 910 poly(phenylene ether)/nylon/styrenic polymer alloy, available from General Electric Company;

"PPE V" is unalloyed poly(phenylene ether) available from Aldrich:

"PPE/PMMA blend" is a 50/50 weight ratio blend of poly(phenylene ether) and poly(methyl methacrylate), prepared by melt mixing a dry mix of the two polymers at 300° C.:

"PPE/ABS blend" is a 50/50 weight ratio blend of poly(phenylene ether) and acrylonitrile/butadiene/styrene copolymer, prepared by melt mixing a dry mix of the two polymers at 300° C.;

"Kraton=G 1651" copolymer is a hydrogenated styrene/butadiene/styrene tri-block thermoplastic elastomeric copolymer, available from Shell Oil Company:

"ABS 29" is emulsion produced acrylonitrile/butadiene/styrene copolymer having approximately 20 weight percent rubber, available from The Dow Chemical Company;

"ABS 32" is mass produced acrylonitrile/butadiene/styrene copolymer having

, available from approximately 7 weight percent rubber The Dow Chemical Company:

"ABS 39" is emulsion produced acrylonitrile/butadiene/styrene copolymer having approximately 24 weight percent rubber, available from The Dow Chemical Company:

"ABS 73" is a blended mass/emulsion produced hybrid acrylonitrile/butadiene/styrene/phenyl maleimide copolymer having approximately 16 weight percent rubber, available from The Dow Chemical Company;

"Polystyrene" is polystyrene, available from The Dow Chemical Company:

"SAN" is styrene/acrylonitrile copolymer, available from The Dow Chemical Company;

"PMMA" is Plexiglas™ V-052 poly(methyl methacrylate) having a heat deflection temperature under load at 264 psi of 199° F (determined according to ASTM Designation D648-82), available from Rohm & Haas Company:

"Nylon 6/6" is polyamide, available from E.I. du Pont de Nemours & Co.

"Carbon black" is powdered black pigment: and

"PET" is Tratuf™ 9506 poly(ethylene terephthalate) having an 0.95 intrinsic viscosity, available from Goodyear Tire and Rubber Company.

Gloss measurements are performed on testing samples according to ASTM Designation D 523-85 using a Dr. Lange Reflectometer RB3 available from Hunter Associates. Results of gloss measurements are also reported in Tables II, 111, IV, V and VI.

In Tables 11, III. IV, V and VI, Controls A-K are indicated by C-A, C-B, C—C etc., and Examples 1-27 are indicated by E-1, E-2, E-3 etc.

TABLE II

|  | C-A | C-B | E-1 | E-2 | E-3 | E-4 | E-5 |
|---|---|---|---|---|---|---|---|
| SAN | 2,000 | 1,850 | 1,900 | 1,800 | 1,700 | 1,900 | 1,800 |
| Kraton ™ G 1651 |  |  |  | 100 | 200 |  | 100 |
| Polystyrene |  | 150 |  |  |  |  |  |
| PPE II |  |  |  |  |  | 100 | 100 |
| PPE III |  |  | 100 | 100 | 100 |  |  |
| Carbon black | 4 | 4 | 2 | 4 | 3 | 4 | 4 |
| 20° Gloss | 92 | 93 | 8 | 6 | 2 | 15 | 6 |
| 60° Gloss | 100 | 100 | 43 | 37 | 19 | 54 | 37 |

TABLE III

|  | C-C | C-D | E-6 | E-7 | E-8 | E-9 | C-E | E-10 | E-11 | E-12 | E-13 |
|---|---|---|---|---|---|---|---|---|---|---|---|
| ABS 29 | 2,000 | 1,900 | 1,900 | 1,900 | 1,900 | 1,900 | 1,800 | 1,800 | 1,800 | 1,800 | 1,800 |
| Kraton ™ G-1651 |  |  |  |  |  |  | 100 | 100 | 100 | 100 | 100 |
| Polystyrene |  | 100 |  |  |  |  | 100 |  |  |  |  |
| PPE I |  |  |  |  | 100 |  |  |  |  | 100 |  |
| PPE II |  |  |  | 100 |  |  |  |  | 100 |  |  |
| PPE III |  |  | 100 |  |  |  |  | 100 |  |  |  |
| PPE V |  |  |  |  |  | 100 |  |  |  |  | 100 |
| Carbon Black | 4 | 4 | 4 | 4 | 4 | 4 | 4 | 4 | 4 | 4 | 4 |
| 20° Gloss | 85 | 83 | 66 | 36 | 24 | 31 | 71 | 37 | 26 | 28 | 25 |
| 60° Gloss | 97 | 96 | 94 | 79 | 68 | 70 | 91 | 82 | 74 | 72 | 67 |

TABLE IV

|  | C-F | E-14 | E-15 | C-G | E-16 |
|---|---|---|---|---|---|
| ABS 32 | 2,000 | 1,900 | 1,800 |  |  |
| ABS 73 |  |  |  | 2,000 | 1,800 |
| Kraton ™ G 1651 |  |  | 100 |  | 100 |
| PPE I |  | 100 | 100 |  |  |
| PPE II |  |  |  |  | 100 |
| Carbon Black | 4 | 2 | 3 | 4 | 4 |
| 20° Gloss | 25 | 19 | 15 | 85 | 4 |
| 60° Gloss | 72 | 69 | 62 | 96 | 30 |

TABLE V

|  | C-H | C-I | C-J | C-K | E-17 | E-18 | E-19 | E-20 | E-21 |
|---|---|---|---|---|---|---|---|---|---|
| SAN | 2,000 | 1,850 |  |  | 1,900 | 1,800 | 1,700 | 1,900 | 1,800 |
| Kraton ™ G 1651 |  |  |  | 200 |  | 100 | 200 |  | 100 |
| Polystyrene |  | 150 | 1,900 |  |  |  |  |  |  |
| PPE I |  |  |  | 1,800 |  |  |  |  |  |
| PPE II |  |  |  |  |  |  |  | 100 | 100 |
| PPE III |  |  | 100 |  | 100 | 100 | 100 |  |  |
| 20° Gloss | 92 | 93 | 97 | 90 | 8 | 6 | 2 | 15 | 6 |
| 60° Gloss | 100 | 100 | 103 | 99 | 43 | 37 | 19 | 54 | 37 |

TABLE VI

| | E-22 | E-23 | E-24 | E-25 | E-26 | E-27 |
|---|---|---|---|---|---|---|
| ABS 29 | 1,900 | 1,900 | | | | |
| ABS 39 | | | 950 | 900 | | 875 |
| ABS 73 | | | | | 900 | |
| Kraton ™ 1651 | | | | 100 | 100 | 100 |
| Nylon 6/6 | | | 950 | 900 | 900 | |
| PET | | | | | | 925 |
| PPE III | 100 | 100 | | | | |
| PPE IV | | | | | 100 | |
| PPE/ABS blend | | | 100 | 100 | | 100 |
| 20° Gloss | 66 | 65 | 66 | 35 | 15 | 18 |
| 60° Gloss | 94 | 91 | 92 | 78 | 62 | 65 |

The results of the tests performed on the plaques molded from the compositions of Controls A–K and Examples 1–23 demonstrate the lower level of gloss, particularly at 20°, which characterizes the plaques molded from the compositions containing poly(phenylene ether). Examples 24–27 demonstrate lower gloss levels of compositions containing blends of styrenic copolymers with other thermoplastic resins and low levels of poly(phenylene ether). Small quantities of poly(phenylene ether), 5 weight percent of the blend or less (for example 4.5 weight percent or less, or 3 weight percent or less), are typically sufficient to achieve this effect. The presence of poly(phenylene ether) does not detract from the effect of ignition resistance additives in the blend. The samples molded from Examples 1–27 showed uniform color with reduced pearlescence and were characterized by reduced gloss.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. An improved composition of matter of the type which comprises, in admixture,
   (a) styrene/acrylonitrile/phenyl maleimide copolymer or rubber-modified styrene/acrylonitrile/phenyl maleimide copolymer;
   (b) (i) poly(phenylene ether),
   (ii) a blend of poly(phenylene ether) with one or more of components (A) to (F), as follows:
   (A) polystyrene,
   a random, alternate, block, hydrogenated block or grafted copolymer prepared from a vinyl aromatic compound and one or more members of the group consisting of a vinyl nitrile compound, a diene, an alkyl acrylate, an alkyl methacrylate, glycidyl methacrylate, ethylene/propylene/diene copolymer, maleic anhydride, an alkyl or aryl maleimide compound, and an oxazoline compound,
   (C) polycarbonate,
   (D) polyester,
   (E) poly(alkyl acrylate), and
   (F) poly(alkyl methacrylate); or
   (iii) a mixture thereof; and
   (c) polyamide,
   wherein the poly(phenylene ether) is present in the composition in an amount of 5 weight percent of the composition or less.

2. The composition of claim 1 wherein
   component (b)(ii) comprises one or more of the group consisting of a poly(phenylene ether)/high impact polystyrene alloy, a poly(phenylene ether)/polystyrene alloy, a poly(phenylene ether)/styrene-butadiene-styrene block copolymer alloy, a poly(phenylene ether)/hydrogenated styrene-butadiene-styrene block copolymer alloy, and a a rubber-modified vinyl nitrile/vinyl aromatic/aryl maleimide copolymer.

3. The composition of claim 1 wherein the poly(phenylene ether) is present in the composition in an amount of 4.5 weight percent of the composition or less.

4. The composition of claim 1 wherein the poly(phenylene ether) is present in the composition in an amount of 3 weight percent of the composition or less.

5. The composition of claim 1 wherein component (a) is present in the composition in an amount of about 35 parts to about 93 parts, by weight of the total composition.

6. The composition of claim 1 wherein the poly(phenylene ether) is comprised of a plurality of structural units described generally by the formula wherein each $Q^1$ is independently hydrogen, halogen, primary or secondary $C_1$–$C_8$ alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary $C_1$–$C_8$ alkyl, phenyl, haloalkyl, hydrocarbonoxy or halohydrocarbonoxy wherein at least two carbon atoms separate the halogen and oxygen atoms.

7. The composition of claim 1 wherein the vinyl aromatic compound in component (b) is styrene or a substituted derivative thereof.

* * * * *